US008849260B2

(12) United States Patent
Kwon

(10) Patent No.: US 8,849,260 B2
(45) Date of Patent: Sep. 30, 2014

(54) APPARATUS AND METHOD FOR PROVIDING SHORTCUT SERVICE IN PORTABLE TERMINAL

(71) Applicant: Samsung Electronics Co., Ltd, Gyeonggi-do (KR)

(72) Inventor: Woo-Up Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/682,666

(22) Filed: Nov. 20, 2012

(65) Prior Publication Data

US 2013/0178199 A1 Jul. 11, 2013

(30) Foreign Application Priority Data

Jan. 11, 2012 (KR) .................. 10-2012-0003520

(51) Int. Cl.
*H04L 29/06* (2006.01)
*H04W 4/00* (2009.01)
*G06F 9/44* (2006.01)

(52) U.S. Cl.
CPC ............ *H04W 4/001* (2013.01); *G06F 9/4443* (2013.01)
USPC ............... 455/414.3; 455/414.1; 455/466; 455/557; 345/173; 345/156; 345/157; 715/763; 715/856; 715/779

(58) Field of Classification Search
USPC .......... 455/575.1, 414.1, 466, 411, 420, 557; 715/700, 763, 779, 856; 345/173, 156, 345/157, 169, 175, 520, 619
See application file for complete search history.

(56) References Cited

U.S. PATENT DOCUMENTS

| 2005/0070344 | A1* | 3/2005 | Im et al. ................ 455/575.1 |
| 2006/0143578 | A1* | 6/2006 | Maktedar ................ 715/847 |
| 2007/0112917 | A1* | 5/2007 | Tang ..................... 709/206 |
| 2007/0126714 | A1* | 6/2007 | Imamura ................. 345/173 |
| 2007/0143448 | A1* | 6/2007 | Yi ........................ 709/219 |
| 2007/0168654 | A1 | 7/2007 | Kotani |
| 2007/0247434 | A1* | 10/2007 | Cradick et al. ........... 345/173 |
| 2007/0270179 | A1* | 11/2007 | Lee et al. ............... 455/550.1 |
| 2007/0282479 | A1 | 12/2007 | Shibuya et al. |
| 2008/0076481 | A1 | 3/2008 | Iwasaki et al. |
| 2008/0279361 | A1 | 11/2008 | Takaoka et al. |
| 2010/0014693 | A1 | 1/2010 | Park et al. |
| 2010/0169660 | A1 | 7/2010 | Voss et al. |
| 2011/0072361 | A1 | 3/2011 | Sakai et al. |

FOREIGN PATENT DOCUMENTS

| JP | 2000-305701 | 11/2000 |
| JP | 2003-134221 | 5/2003 |

(Continued)

OTHER PUBLICATIONS

Appleflap: "[APP] ButtonRemapper—Beta vo.2.4 (New Galaxy S version added)", internet citation, Feb. 20, 2011, pp. 1-6.

(Continued)

*Primary Examiner* — Quan M Hua

(57) ABSTRACT

An apparatus and a method provide a shortcut service to execute a service in a portable terminal. The method for setting the shortcut service includes when a shortcut service setup event generates, determining a service to map onto a shortcut service button among at least one service provided by the portable terminal; and storing the shortcut service button and service information mapped onto the shortcut service button.

22 Claims, 16 Drawing Sheets

(56) References Cited

FOREIGN PATENT DOCUMENTS

| | | |
|---|---|---|
| JP | 2007194705 A | 8/2007 |
| JP | 2007-323222 | 12/2007 |
| JP | 2008-076818 | 4/2008 |
| JP | 2008283518 A | 11/2008 |
| JP | 2010-512042 | 4/2010 |
| JP | 2011-066850 | 3/2011 |
| JP | 2011-204172 | 10/2011 |

OTHER PUBLICATIONS

Extended European Search Report dated Mar. 7, 2013 in connection with European Application No. 12192027.6, 6 pages.

Notice of Preliminary Rejection dated Oct. 3, 2013 in connection with Japanese Application No. 2012-236892, 7 pages.

Notice of Preliminary Rejection dated May 13, 2014 in connection with Japanese Application No. 2012-236892, 7 pages.

* cited by examiner

APPARATUS AND METHOD FOR PROVIDING SHORTCUT SERVICE IN PORTABLE TERMINAL

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jan. 11, 2012, and assigned Serial No. 10-2012-0003520, the entire disclosure of which is hereby incorporated by reference.

TECHNICAL FIELD OF THE INVENTION

The present invention relates generally to an apparatus and a method for providing a shortcut service in a portable terminal.

BACKGROUND OF THE INVENTION

As the number of portable terminal users greatly increases, portable terminal providers are providing various services to secure more users. For example, in addition to the general communication function, portable terminals provide various application programs such as electronic notebook, Internet search, digital multimedia broadcasting reception, streaming service, video play, and game.

When the user of the portable terminal switches from the current application program to another application program, he/she needs to manipulate the portable terminal several times in order to execute the another application program. For example, when the user requires the Internet search while using a video play program, he/she should terminate the video play program and then select and execute an Internet search program through several manipulations.

The user of the portable terminal sets a control mode such as wireless Internet setup, Bluetooth setup, location service setup, and automatic screen rotation setup through multiple manipulations. For example, to set the automatic screen rotation during the execution of the video play program, the user has to set the automatic screen rotation through a quick panel and then to execute the video play program.

Hence, what is needed is a user interface allowing the user to easily execute his/her intended application program and to easily set the control mode in the portable terminal.

SUMMARY OF THE INVENTION

To address the above-discussed deficiencies of the prior art, it is a primary aspect of the present disclosure to provide an apparatus and a method for providing an application driving shortcut service in a portable terminal.

Another aspect of the present disclosure is to provide an apparatus and a method for providing a shortcut service to drive another application in a portable terminal which is driving one application.

Yet another aspect of the present disclosure is to provide an apparatus and a method for providing an application driving shortcut service by considering a shortcut service button input count in a portable terminal.

Still another aspect of the present disclosure is to provide an apparatus and a method for providing an application driving shortcut service by considering a shortcut service button input duration in a portable terminal.

A further aspect of the present disclosure is to provide an apparatus and a method for providing a control mode setup shortcut service in a portable terminal.

A further aspect of the present disclosure is to provide an apparatus and a method for providing a control mode setup shortcut service in a portable terminal which is running an application.

A further aspect of the present disclosure is to provide an apparatus and a method for providing a control mode setup shortcut service by considering a shortcut service button input count in a portable terminal.

A further aspect of the present disclosure is to provide an apparatus and a method for providing a control mode setup shortcut service by considering a shortcut service button input duration in a portable terminal.

According to one aspect of the present disclosure, a method for providing a shortcut service to execute a service in a portable terminal includes when a shortcut service setup event generates, determining a service to map onto a shortcut service button among at least one service provided by the portable terminal; and storing the shortcut service button and service information mapped onto the shortcut service button.

According to another aspect of the present disclosure, an apparatus for providing a shortcut service to execute a service in a portable terminal includes at least one button; a control unit for, when a shortcut service setup event generates, determining a service to map onto the shortcut service button; and a storage unit for storing the shortcut service button and service information mapped onto the shortcut service button. The shortcut service to execute the service includes at least one of an application driving shortcut service and a control mode setup shortcut service.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts. The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

Figure 1:
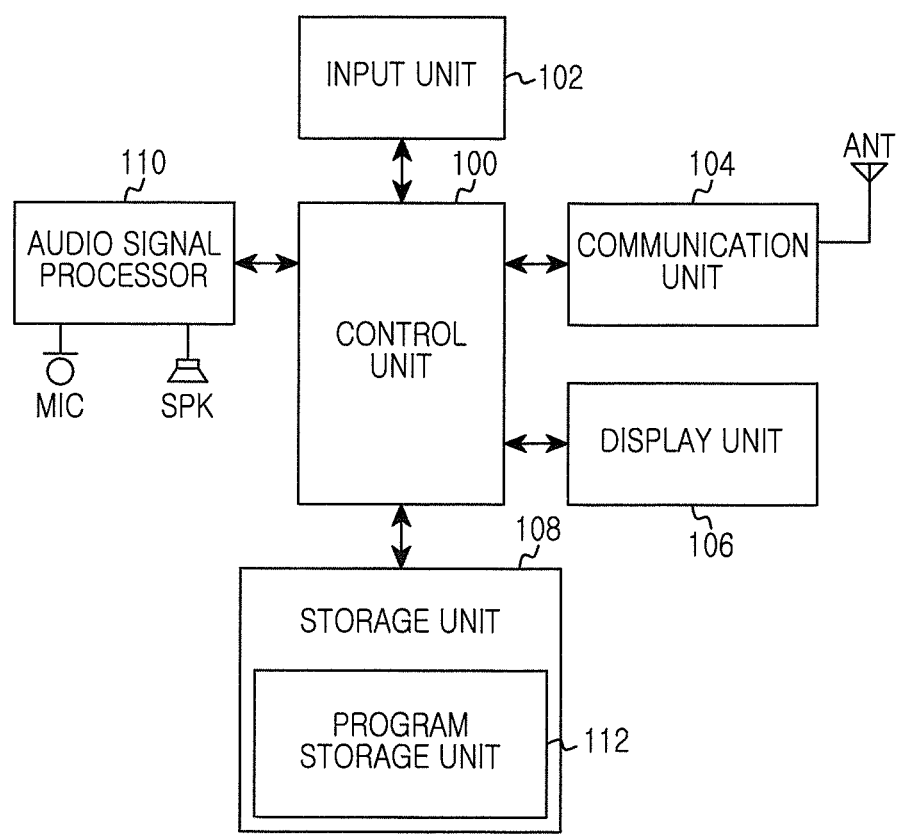
FIG. 1 illustrates a portable terminal according to an exemplary embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for providing a shortcut service to execute a service in a portable terminal.

Hereinafter, the shortcut service for the service execution includes an application driving shortcut service and a control mode setup shortcut service. Applications include a phonebook, a game, a short messaging service, a multimedia message service, e-mail, a wake-up call, MP3, schedule management, a camera, and a wireless Internet service. Control mode setup includes wireless Internet setup, Bluetooth setup, location service setup, and automatic screen rotation setup.

Hereafter, a portable terminal embraces a Personal Digital Assistant (PDA), a laptop computer, a smart phone, a netbook, Mobile Internet Device (MID), an Ultra-Mobile Personal Computer (UMPC), and a table PC.

FIG. 1 is a block diagram of a portable terminal according to an exemplary embodiment of the present disclosure.

The portable terminal includes a control unit 100, an input unit 102, a communication unit 104, a display unit 106, a storage unit 108, and an audio signal processing unit 110.

The control unit 100 controls operations of the portable terminal.

The control unit 100 controls to set the shortcut service for the service execution of the portable terminal. For example, when a shortcut service setup event generates, the control unit 100 controls to display an application list which can be mapped onto a shortcut service button, in the display unit 106. Next, the control unit 100 recognizes the application selected in the application list displayed in the display unit 106, as an application to map onto the shortcut service button. For example, the control unit 100 may control to set a shortcut service to execute another application while running the application. For example, when the shortcut service setup event generates, the control unit 100 controls to display a control mode list which can be mapped onto the shortcut service button, in the display unit 106. Next, the control unit 100 recognizes the control mode selected in the control mode list displayed in the display unit 106, as a control mode to map onto the shortcut service button. For example, the control unit 100 may control to set the shortcut for the control mode setup while running the application.

The control unit 100 controls to provide the shortcut service for the service execution of the portable terminal. For example, when a shortcut service button input event generates, the control unit 100 controls to drive the application mapped onto the shortcut service button. For example, when the shortcut service button input event generates during the application driving, the control unit 100 may control to drive other application mapped onto the shortcut service button. For example, when the shortcut service button input event generates, the control unit 100 controls to set a control mode mapped onto the shortcut service button. For example, when the shortcut service button input event generates during the application driving, the control unit 100 may control to set the control mode mapped onto the shortcut service button.

The input unit 102 provides input data generated by the user's selection to the control unit 100. For example, the input unit 102 includes a button for controlling the portable terminal. For example, the input unit 102 may include, separately from the display unit 106, a keypad for receiving the input data from a user.

The communication unit 104 processes signals transmitted and received over an antenna for voice and data communication.

The display unit 106 displays information. Under the control of the control unit 100, the display unit 106 displays status information of the portable terminal, characters input by the user, videos, and still images. When the display unit 106 includes a touch screen, it may function as an input means in addition to the information display means.

The storage unit 108 can include a program storage unit 112 for storing a program to control the operations of the portable terminal, and a data storage unit for storing data generating in the program execution. For example, the data storage unit stores the shortcut service button and the application information mapped onto the shortcut service button under the control of the control unit 100. The data storage unit may store the shortcut service button and the control mode information mapped onto the shortcut service button under the control of the control unit 100. For example, the program storage unit 112 may store an instruction set or a program as a set of instructions for providing the shortcut service in the control unit 100.

The audio signal processor 110 controls input and output of an audio signal. For example, the audio signal processor 110 transmits the audio signal fed from the control unit 100 to the outside through a speaker and provides the audio signal fed from a microphone to the control unit 100.

Figure 2:
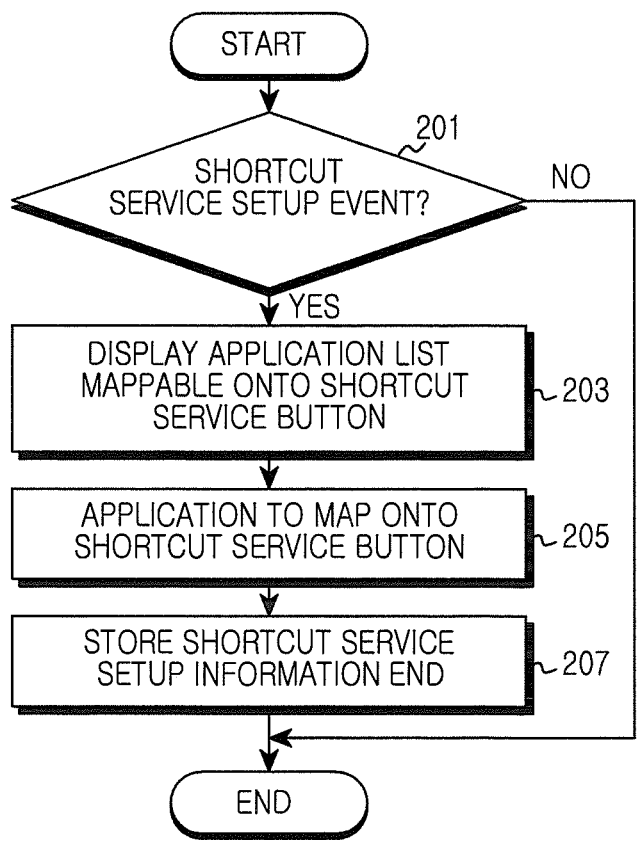
FIG. 2 illustrates a method for setting an application driving shortcut service in the portable terminal according to an exemplary embodiment of the present disclosure.

FIG. 2 illustrates a method for setting an application driving shortcut service in the portable terminal according to an exemplary embodiment of the present disclosure.

Referring to FIG. 2, the control unit 100 determines whether the shortcut service setup event occurs in step 201. For example, in the portable terminal of FIG. 1, the control unit 100 determines whether the user selects a shortcut service setup menu through the input unit 102 or the display unit 106 of the portable terminal.

When the shortcut service setup event does not take place, the control unit 100 finishes this process.

By contrast, when the shortcut service setup event generates, the control unit 100 displays the application list which can be mapped onto a preset shortcut service button in step 203. For example, the control unit 100 displays at least one application mappable onto the shortcut service button in the display unit 106. Herein, the shortcut service button includes at least one button mappable onto the application for providing the shortcut service among the buttons of the portable terminal. For example, the shortcut service button includes hardware buttons such as power button, home button, and volume control button. For example, when the portable terminal includes the touch screen, the shortcut service button may include, displayable in the touch screen, at least one software button or/and at least one icon mappable onto the shortcut service. Hereafter, it is assumed that the shortcut service button employs the hardware button.

In step 205, the control unit 100 determines any one of the at least one application of the application list, to be mapped onto the shortcut service button. For example, the control unit 100 recognizes any one application selected by the portable terminal user among the at least one application displayed in the display unit 106, as the application to map onto the shortcut service button.

In step 207, the control unit 100 stores the shortcut service button and the application information mapped onto the shortcut service button.

Next, the control unit 100 finishes this process.

In this exemplary embodiment, the control unit 100 displays the application list mappable onto the shortcut service button and then recognizes the selected application as the application to be mapped onto the shortcut service button. In other embodiments, the user may input the application to be mapped onto the shortcut service button in person.

In this exemplary embodiment, the control unit 100 determines the application to be mapped onto the preset shortcut service button. In other embodiments, the control unit 100 may map the application by taking into account of a shortcut service button input count (e.g., a number of times the shortcut service button was input) or a shortcut service button input duration.

In other embodiments, the user may select the shortcut service button for the application driving shortcut service.

Figure 3:
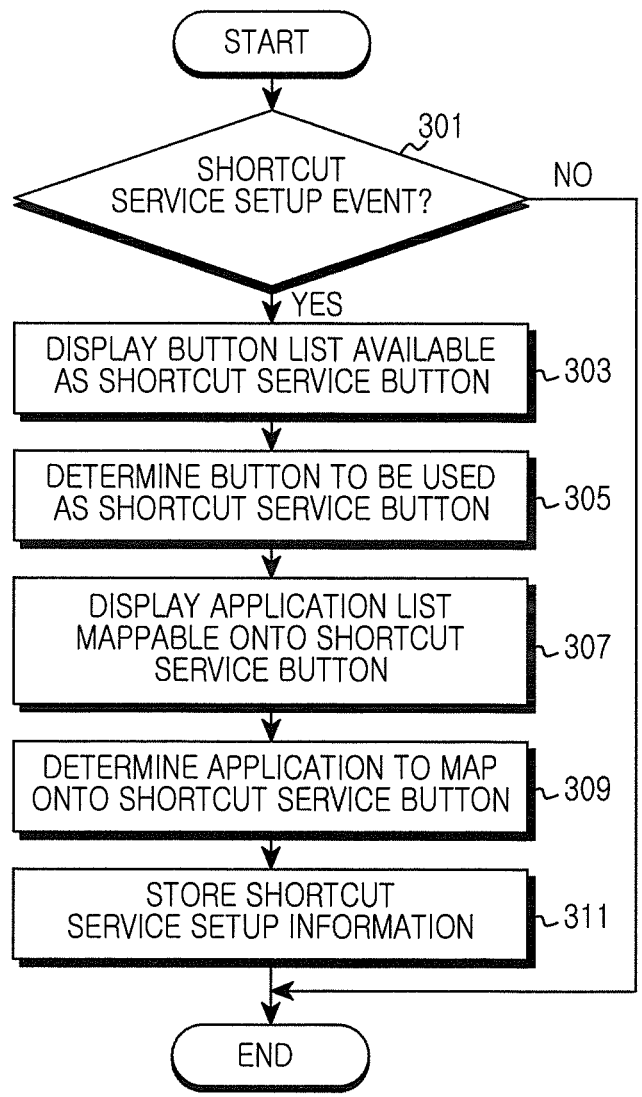
FIG. 3 illustrates a method for determining a shortcut service button for the application driving shortcut service in the portable terminal according to an exemplary embodiment of the present disclosure.

FIG. 3 illustrates a method for determining the shortcut service button for the application driving shortcut service in the portable terminal according to an exemplary embodiment of the present disclosure.

Referring to FIG. 3, the control unit 100 determines whether the shortcut service setup event occurs in step 301. For example, in the portable terminal of FIG. 1, the control unit 100 determines whether the user selects the shortcut service setup menu through the input unit 102 or the display unit 106 of the portable terminal.

When the shortcut service setup event does not take place, the control unit 100 finishes this process.

By contrast, when the shortcut service setup event generates, the control unit 100 displays a button list available as the shortcut service button in step 303. Herein, the shortcut service button indicates a button for mapping the application to provide the shortcut service. The button list available as the shortcut service button includes at least one of the buttons of the portable terminal.

In step 305, the control unit 100 determines the button to be used as the shortcut service button. For example, the control unit 100 recognizes the button selected by the portable terminal user among the button list available as the shortcut service button displayed in the display unit 106, as the shortcut service button.

In step 307, the control unit 100 displays the application list mappable onto the shortcut service button. For example, the control unit 100 displays at least one application mappable onto the shortcut service button, in the display unit 106.

In step 309, the control unit 100 determines any one application to be mapped onto the shortcut service button among the at least one application of the application list. For example, the control unit 100 recognizes the application selected by the portable terminal user among the at least one application displayed in the display unit 106, as the application to map onto the shortcut service button.

In step 311, the control unit 100 stores the shortcut service button and the application information mapped onto the shortcut service button.

Next, the control unit 100 finishes this process.

In this exemplary embodiment, the control unit 100 displays the button list available as the shortcut service button and then recognizes the selected button as the shortcut service button. In other embodiments, the user may input the button to be used as the shortcut service button in person.

As such, the control unit 100 sets the application driving shortcut service. In other embodiments, the control unit 100 may set the shortcut service for driving another application while running the application, as shown in FIG. 4.

Figure 4:
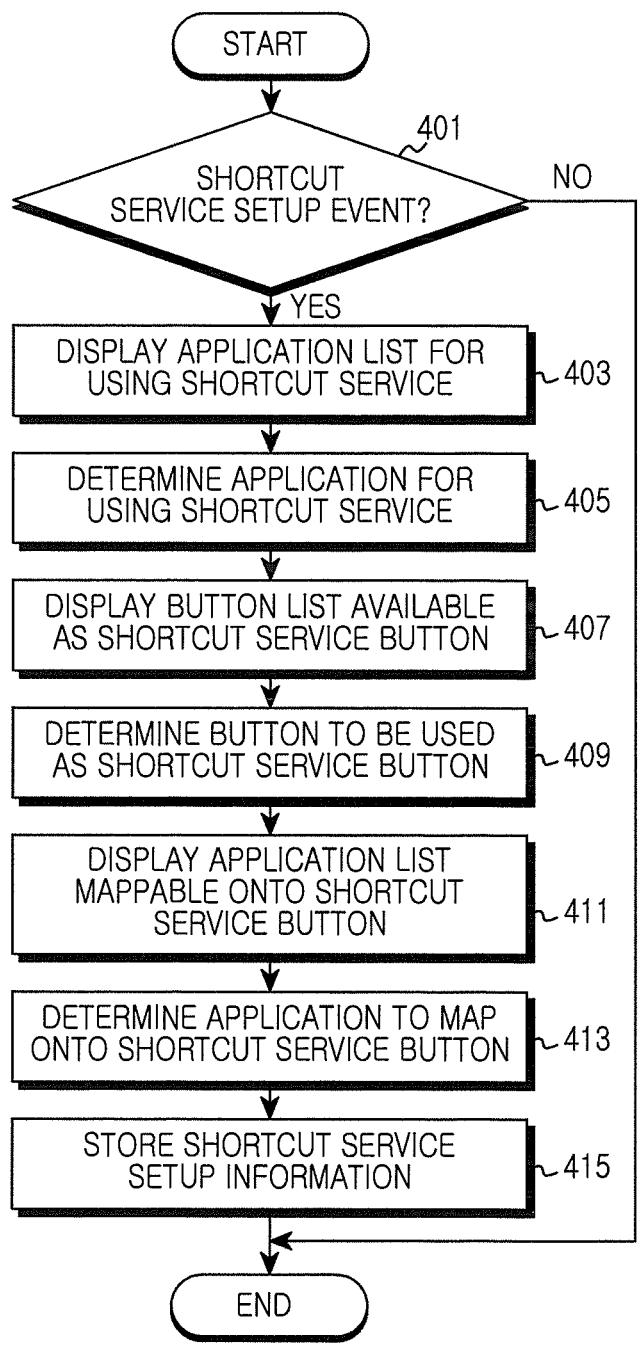
FIG. 4 illustrates a method for setting a shortcut service to drive another application in the portable terminal which is running one application according to an exemplary embodiment of the present disclosure.

FIG. 4 illustrates a method for setting a shortcut service to drive another application in the portable terminal which is running one application according to an exemplary embodiment of the present disclosure.

Referring to FIG. 4, the control unit 100 determines whether the shortcut service setup event occurs in step 401. For example, in the portable terminal of FIG. 1, the control unit 100 determines whether the user selects the shortcut service setup menu through the input unit 102 or the display unit 106 of the portable terminal.

When the shortcut service setup event does not take place, the control unit 100 finishes this process.

In step 403, the control unit 100 displays the application list for using the shortcut service. For example, the control unit 100 displays at least one application for using the shortcut service, in the display unit 106.

In step 405, the control unit 100 determines the application for using the shortcut service. For example, the control unit 100 recognizes the application selected by the portable terminal user among the at least one application displayed in the display unit 106, as the application for using the shortcut service.

In step 407, the control unit 100 displays the button list available as the shortcut service button in the display unit 106. Herein, the shortcut service button indicates the button for mapping the application to provide the shortcut service.

In step 409, the control unit 100 determines the button to be used as the shortcut service button. For example, the control unit 100 recognizes the button selected by the portable terminal user among the at least one button displayed in the display unit 106, as the shortcut service button.

In step 411, the control unit 100 displays the application list mappable onto the shortcut service button. For example, the control unit 100 displays at least one application mappable onto the shortcut service button, in the display unit 106.

In step 413, the control unit 100 determines any one application to be mapped onto the shortcut service button among the at least one application of the application list. For example, the control unit 100 recognizes the application selected by the portable terminal user among the at least one application displayed in the display unit 106, as the application to map onto the shortcut service button.

In step 415, the control unit 100 stores the shortcut service button and the application information mapped onto the shortcut service button.

Next, the control unit 100 finishes this process.

In this exemplary embodiment, when the shortcut service setup event generates, the control unit 100 determines the application for providing the shortcut service.

In other embodiments, when the shortcut service setup event takes place in process of the application driving, the control unit 100 may set the shortcut service for the running application.

Figure 5:
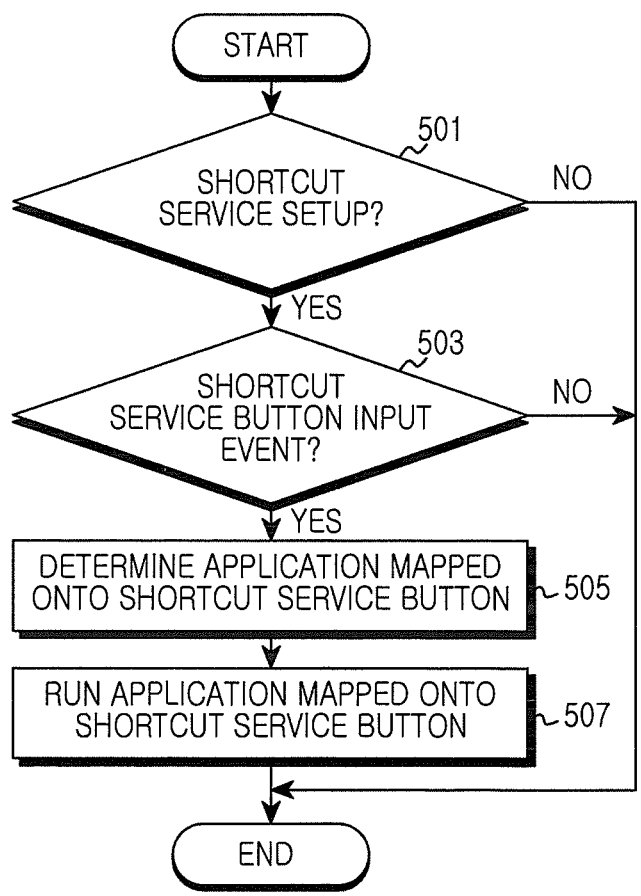
FIG. 5 illustrates a method for providing the application driving shortcut service in the portable terminal according to an exemplary embodiment of the present disclosure.

As such, when the application driving shortcut service is set in the portable terminal, the control unit 100 can provide the application driving shortcut service as shown in FIG. 5.

FIG. 5 illustrates a method for providing the application driving shortcut service in the portable terminal according to an exemplary embodiment of the present disclosure.

Referring to FIG. 5, the control unit 100 determines whether the application driving shortcut service is set in step 501. For example, in the portable terminal of FIG. 1, the control unit 100 determines whether there exists setup information of the application driving shortcut service configured by the portable terminal user.

When the application driving shortcut service is not set, the control unit 100 finishes this process.

By contrast, when the application driving shortcut service is set, the control unit 100 determines whether the shortcut service button input event occurs in step 503. For example, the control unit 100 checks whether the user inputs the shortcut service button.

When the shortcut service button input event does not generate, the control unit 100 finishes this process.

By contrast, when the shortcut service button input event occurs, the control unit 100 determines the application mapped onto the shortcut service button in step 505.

In step 507, the control unit 100 runs the application mapped onto the shortcut service button. Hence, the control unit 100 displays the driving screen of the application mapped onto the shortcut service button in the display unit 106 in step 503. For example, when the Internet program is mapped onto the power button of the portable terminal, the control unit 100 determines whether the power button is input. When the power button of the portable terminal is pressed, the control unit 100 displays the driving screen of the Internet program mapped onto the power button in the display unit 106.

Next, the control unit 100 finishes this process.

In this exemplary embodiment, the control unit 100 runs the application mapped onto the shortcut service button.

In other embodiments, the control unit 100 may provide the application driving shortcut service by considering the shortcut service button input count.

Figure 6:
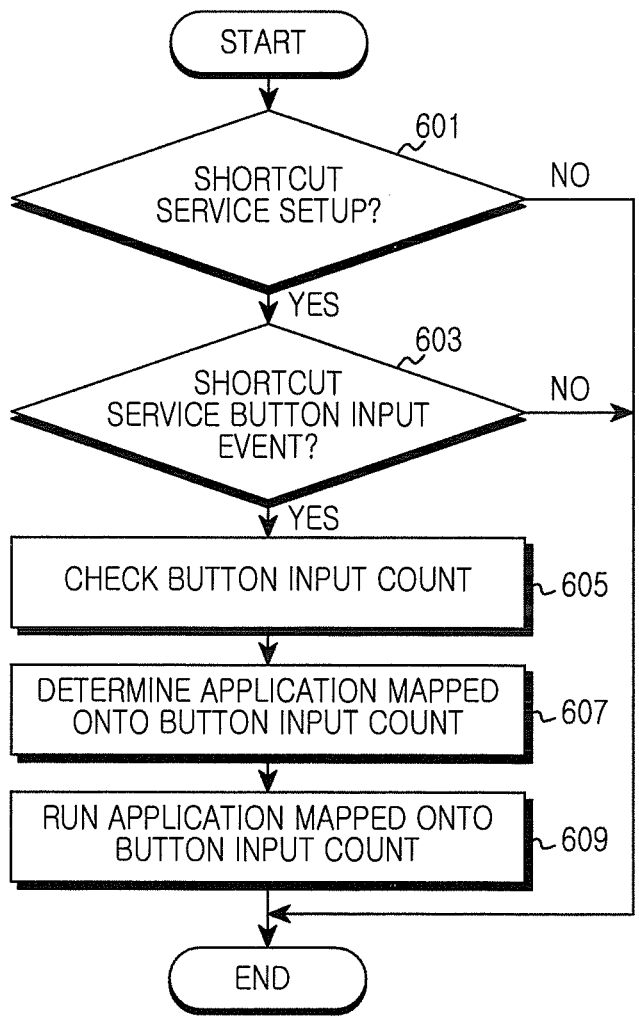
FIG. 6 illustrates a method for providing the application driving shortcut service by considering a shortcut service button input count in the portable terminal according to an exemplary embodiment of the present disclosure.

FIG. 6 illustrates a method for providing the application driving shortcut service by considering the shortcut service button input count in the portable terminal according to an exemplary embodiment of the present disclosure.

Referring to FIG. 6, the control unit 100 determines whether the application driving shortcut service is set in step 601. For example, in the portable terminal of FIG. 1, the control unit 100 determines whether there exists the setup information of the application driving shortcut service configured by the portable terminal user.

When the application driving shortcut service is not set, the control unit 100 finishes this process.

By contrast, when the application driving shortcut service is set, the control unit 100 determines whether the shortcut service button input event occurs in step 603. For example, the control unit 100 checks whether the user inputs the shortcut service button.

When the shortcut service button input event does not generate, the control unit 100 finishes this process.

By contrast, when the shortcut service button input event generates, the control unit 100 determines the shortcut service button input count in step 605. For example, when the user presses the shortcut service button in step 603, the control unit 100 checks the button count or the number of times the user pressed the button such as one time, two times, three times, etc.

In step 607, the control unit 100 determines the application mapped onto the shortcut service button input count.

In step 609, the control unit 100 runs the application mapped onto the shortcut service button input count. Hence, the control unit 100 displays the driving screen of the application mapped onto the shortcut service button input count pressed by the user in step 603, in the display unit 106.

Next, the control unit 100 finishes this process.

In this exemplary embodiment, the control unit 100 provides the application driving shortcut service by considering the shortcut service button input count.

In other embodiments, the control unit 100 may provide the application driving shortcut service by considering the shortcut service button input duration.

Figure 7:
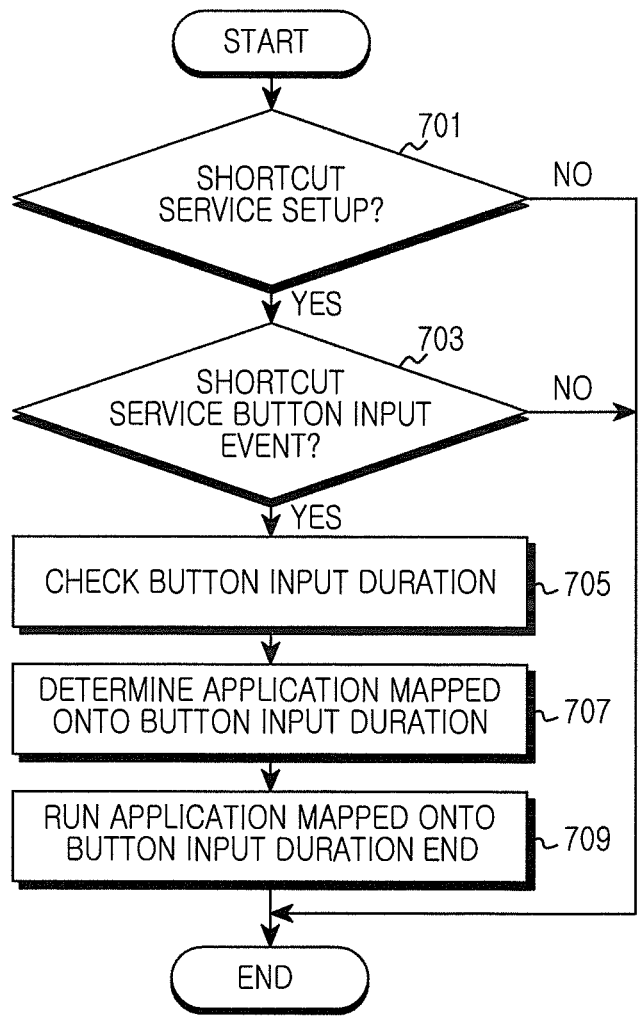
FIG. 7 illustrates a method for providing the application driving shortcut service by considering a shortcut service button input duration in the portable terminal according to an exemplary embodiment of the present disclosure.

FIG. 7 illustrates a method for providing the application driving shortcut service by considering the shortcut service button input duration in the portable terminal according to an exemplary embodiment of the present disclosure.

Referring to FIG. 7, the control unit 100 determines whether the application driving shortcut service is set in step 701. For example, in the portable terminal of FIG. 1, the control unit 100 determines whether there exists the setup information of the application driving shortcut service configured by the portable terminal user.

When the application driving shortcut service is not set, the control unit 100 finishes this process.

By contrast, when the application driving shortcut service is set, the control unit 100 determines whether the shortcut service button input event generates in step 703. For example, in the portable terminal of FIG. 1, the control unit 100 checks whether the user inputs the shortcut service button.

When the shortcut service button input event does not take place, the control unit 100 finishes this process.

By contrast, when the shortcut service button input event generates, the control unit 100 determines the shortcut service button input duration in step 705. For example, when the user presses the shortcut service button in step 703, the control unit 100 checks the button input duration such as 2~5 seconds and 5~10 seconds.

In step 707, the control unit 100 determines the application mapped onto the shortcut service button input duration.

In step 709, the control unit 100 runs the application mapped onto the shortcut service button input duration. Hence, the control unit 100 displays the driving screen of the application mapped onto the shortcut service button input duration of step 703, in the display unit 106.

Next, the control unit 100 finishes this process.

As such, the control unit 100 provides the application driving shortcut service.

Now, a method for providing the shortcut service for driving another application in the portable terminal which is running one application is explained.

Figure 8:
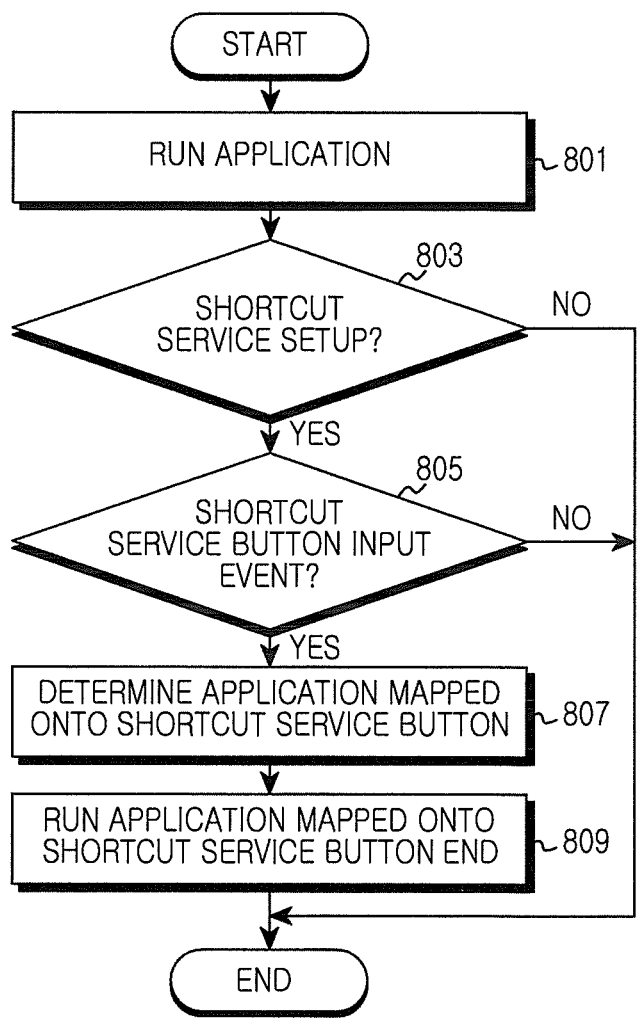
FIG. 8 illustrates a method for providing a shortcut service to drive another application in the portable terminal which is running one application according to an exemplary embodiment of the present disclosure.

FIG. 8 illustrates a method for providing the shortcut service to drive another application in the portable terminal which is running one application according to an exemplary embodiment of the present disclosure.

Referring to FIG. 8, the control unit 100 runs the application program for providing the shortcut service in step 801.

In step 803, the control unit 100 determines whether the application driving shortcut service is set. For example, in the portable terminal of FIG. 1, the control unit 100 determines whether there exists the setup information of the application driving shortcut service configured by the portable terminal user.

When the application driving shortcut service is not set, the control unit 100 finishes this process.

By contrast, when the application driving shortcut service is set, the control unit 100 determines whether the shortcut service button input event generates in step 805. For example, the control unit 100 checks whether the user inputs the shortcut service button.

When the shortcut service button input event does not occur, the control unit 100 finishes this process.

By contrast, when the shortcut service button input event occurs, the control unit 100 determines the application mapped onto the shortcut service button in step 807.

In step 809, the control unit 100 runs the application mapped onto the shortcut service button. Hence, the control unit 100 displays the driving screen of the application mapped onto the shortcut service button input by the user in step 805, in the display unit 106. For example, when the Internet program is mapped onto the power button of the portable terminal, the control unit 100 determines whether the power button is input. When the power button of the portable terminal is pressed, the control unit 100 displays the driving screen of the Internet program mapped onto the power button in the display unit 106.

Next, the control unit 100 finishes this process.

Figure 9:
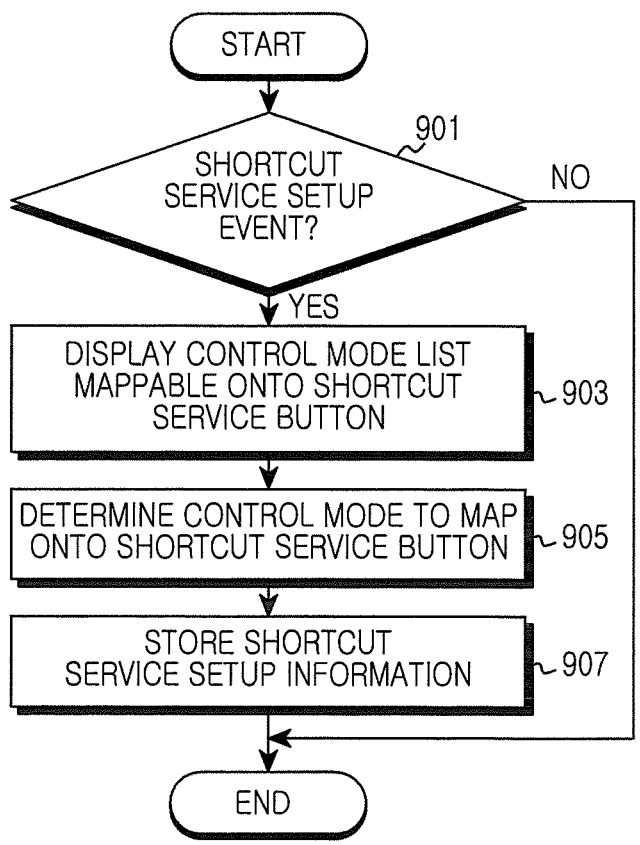
FIG. 9 illustrates a method for setting a control mode setup shortcut service in the portable terminal according to an exemplary embodiment of the present disclosure.

FIG. 9 illustrates a method for setting the control mode setup shortcut service in the portable terminal according to an exemplary embodiment of the present disclosure.

Referring to FIG. 9, the control unit 100 determines whether the shortcut service setup event occurs in step 901. For example, in the portable terminal of FIG. 1, the control unit 100 determines whether the user selects the shortcut service setup menu through the input unit 102 or the display unit 106 of the portable terminal.

When the shortcut service setup event does not occur, the control unit 100 finishes this process.

Figure 10:
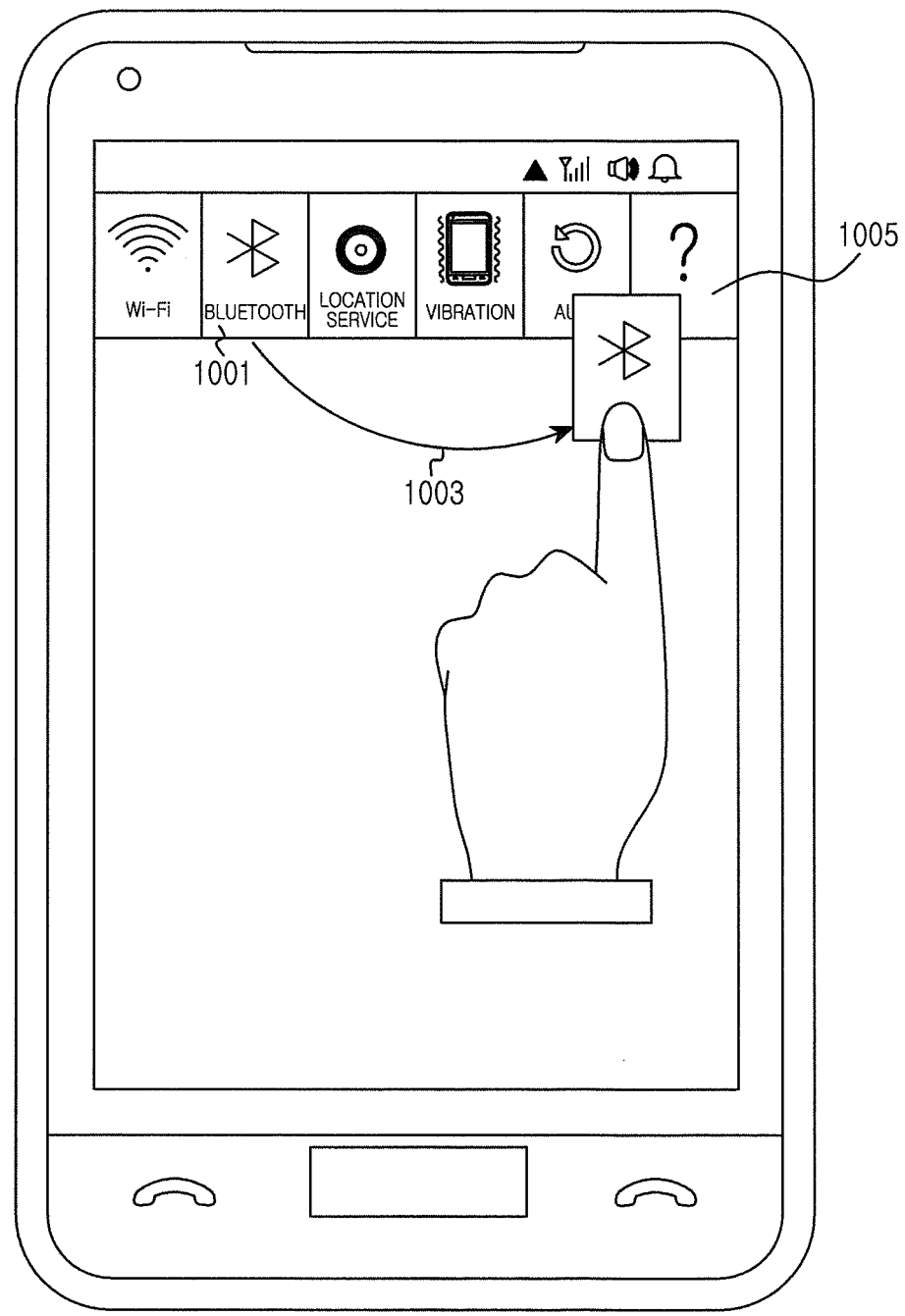
FIG. 10 illustrates a screen for setting the control mode setup shortcut service in the portable terminal according to an exemplary embodiment of the present disclosure.

By contrast, when the shortcut service setup event generates, the control unit 100 displays the control mode list which can be mapped onto the preset shortcut service button in step 903. For example, when the user draws down a quick panel as shown in FIG. 10, the display unit 106 displays at least one control mode mappable onto the shortcut service button. Herein, the shortcut service button includes at least one button for mapping the control mode for the shortcut service among the buttons of the portable terminal.

In step 905, the control unit 100 determines any one of the at least one control mode of the control mode list, to be mapped onto the shortcut service button. For example, when the portable terminal user selects and drags a Bluetooth mode 1001 among one or more control modes displayed in the display unit 106, into a shortcut service setup region 1005 in step 1003 as shown in FIG. 10, the control unit 100 recognizes the Bluetooth mode 1001 as the control mode to be mapped onto the shortcut service button.

In step 907, the control unit 100 stores the shortcut service button and the control mode information mapped onto the shortcut service button.

Next, the control unit 100 finishes this process.

In this exemplary embodiment, the control unit 100 displays the control mode list mappable onto the shortcut service button and then recognizes the selected control mode as the control mode to be mapped onto the shortcut service button. In other embodiments, the user may input the control mode to be mapped onto the shortcut service button in person.

In this exemplary embodiment, the control unit 100 determines the control mode to be mapped onto the preset shortcut service button. In other embodiments, the control unit 100 may map the control mode by taking into account of the shortcut service button input count or the shortcut service button input duration.

In other embodiments, the user may select the shortcut service button for the control mode setup shortcut service.

Figure 11:
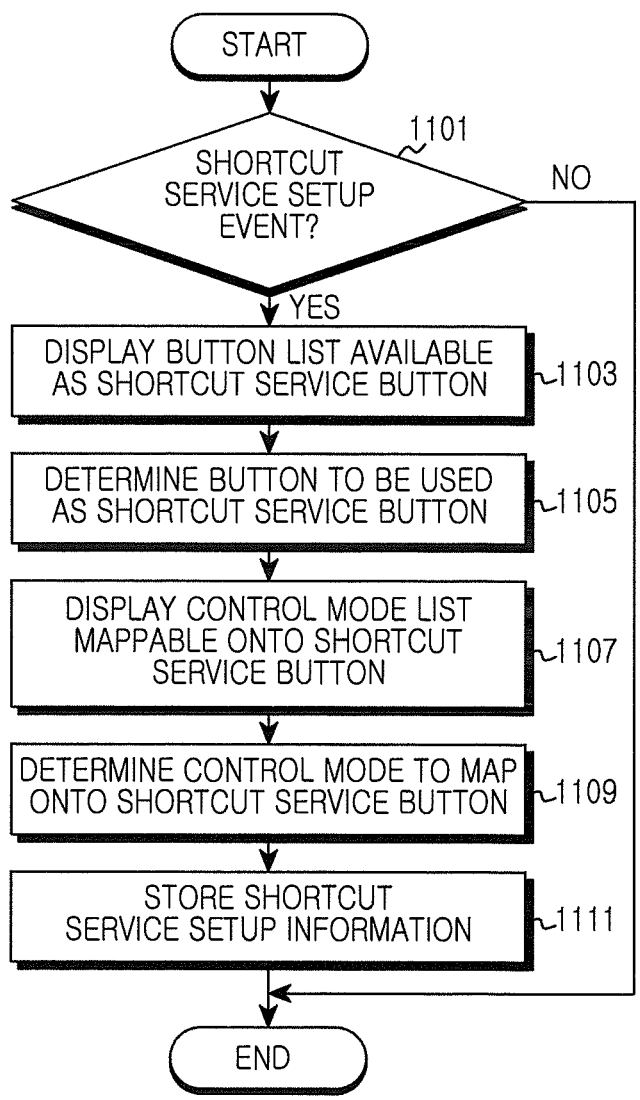
FIG. 11 illustrates a method for determining a shortcut service button for the control mode setup shortcut service in the portable terminal according to an exemplary embodiment of the present disclosure.

FIG. 11 illustrates a method for determining the shortcut service button for the control mode setup shortcut service in the portable terminal according to an exemplary embodiment of the present disclosure.

Referring to FIG. 11, the control unit 100 determines whether the shortcut service setup event occurs in step 1101. For example, in the portable terminal of FIG. 1, the control unit 100 determines whether the user selects the shortcut service setup menu through the input unit 102 or the display unit 106 of the portable terminal.

When the shortcut service setup event does not take place, the control unit 100 finishes this process.

By contrast, when the shortcut service setup event generates, the control unit 100 displays the button list available as the shortcut service button in the display unit 106 in step 1103. Herein, the shortcut service button indicates the button for mapping the application to provide the shortcut service. The button list available as the shortcut service button includes at least one of the buttons of the portable terminal.

In step 1105, the control unit 100 determines the button to be used as the shortcut service button. For example, the control unit 100 recognizes the button selected by the portable terminal user from the button list available as the shortcut service button displayed in the display unit 106, as the shortcut service button.

In step 1107, the control unit 100 displays the control mode list mappable onto the shortcut service button. For example, the control unit 100 displays at least one control mode mappable onto the shortcut service button, in the display unit 106.

In step 1109, the control unit 100 determines any one control mode to be mapped onto the shortcut service button among the at least one control mode of the application list. For example, the control unit 100 recognizes the control mode selected by the portable terminal user among the at least one control mode displayed in the display unit 106, as the control mode to map onto the shortcut service button.

In step 1111, the control unit 100 stores the shortcut service button and the control mode information mapped onto the shortcut service button.

Next, the control unit 100 finishes this process.

In this exemplary embodiment, the control unit 100 displays the button list available as the shortcut service button and then recognizes the selected button as the shortcut service button. In other embodiments, the user may input the button to be used as the shortcut service button in person.

As above, the control unit 100 sets the control mode setup shortcut service. In other embodiments, the control unit 100 may set the shortcut service for setting the control mode while running the application, as shown in FIG. 12.

Figure 12:
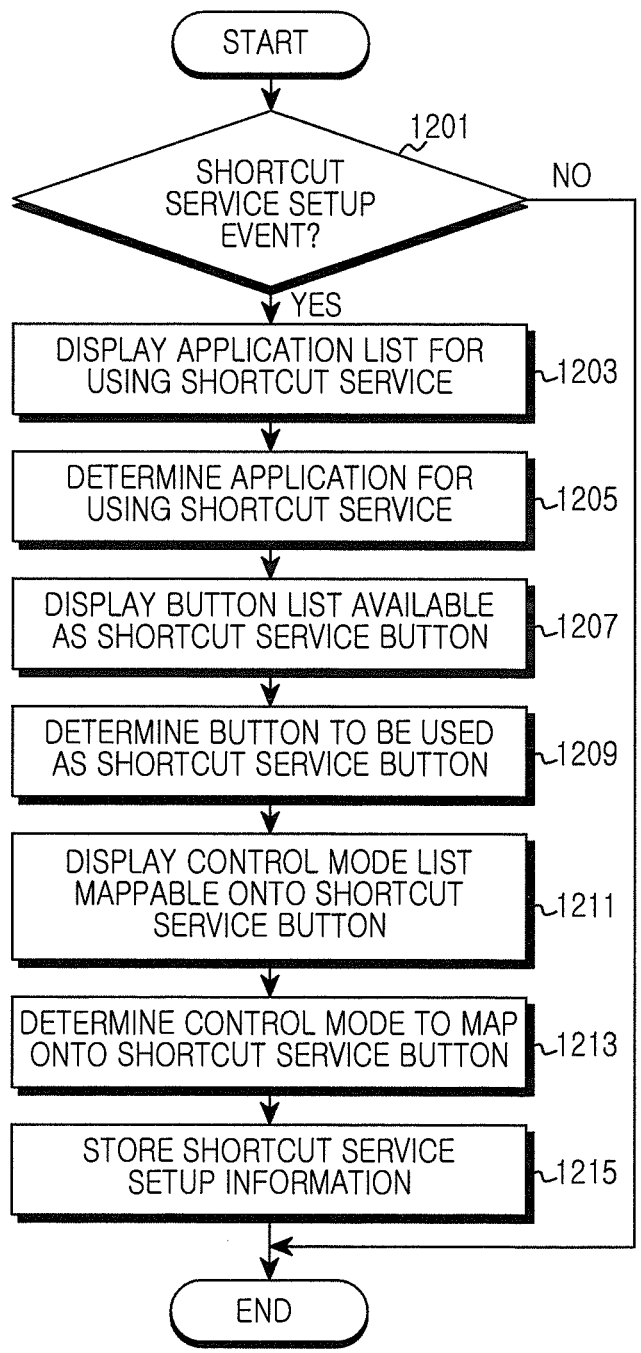
FIG. 12 illustrates a method for setting the control mode setup shortcut service in the portable terminal which is running one application according to an exemplary embodiment of the present disclosure.

FIG. 12 illustrates a method for setting the control mode setup shortcut service in the portable terminal which is running one application according to an exemplary embodiment of the present disclosure.

Referring to FIG. 12, the control unit 100 determines whether the shortcut service setup event occurs in step 1201. For example, in the portable terminal of FIG. 1, the control unit 100 determines whether the user selects the shortcut service setup menu through the input unit 102 or the display unit 106 of the portable terminal.

When the shortcut service setup event does not occur, the control unit 100 finishes this process.

When the shortcut service setup event generates, the control unit 100 displays the application list for using the shortcut service in step 1203. For example, the control unit 100 displays at least one application for using the shortcut service, in the display unit 106.

In step 1205, the control unit 100 determines the application for using the shortcut service. For example, the control unit 100 recognizes the application selected by the portable terminal user among the at least one application displayed in the display unit 106, as the application for using the shortcut service.

In step 1207, the control unit 100 displays the button list available as the shortcut service button in the display unit 106. Herein, the shortcut service button indicates the button for mapping the control mode to provide the shortcut service.

In step 1209, the control unit 100 determines the button to be used as the shortcut service button. For example, the control unit 100 recognizes the button selected by the portable terminal user among the at least one button displayed in the display unit 106, as the shortcut service button.

In step 1211, the control unit 100 displays the control mode list mappable onto the shortcut service button. For example, the control unit 100 displays at least one control mode mappable onto the shortcut service button, in the display unit 106.

In step 1213, the control unit 100 determines any one control mode to be mapped onto the shortcut service button among the at least one control mode of the control mode list. For example, the control unit 100 recognizes the control mode selected by the portable terminal user among the at least one control mode displayed in the display unit 106, as the control mode to map onto the shortcut service button.

In step 1215, the control unit 100 stores the shortcut service button and the control mode information mapped onto the shortcut service button.

Next, the control unit 100 finishes this process.

In this exemplary embodiment, when the shortcut service setup event generates, the control unit 100 determines the control mode for providing the shortcut service.

In other embodiments, when the shortcut service setup event takes place in the process of the application driving, the control unit 100 may set the shortcut service for the running application.

Figure 13:
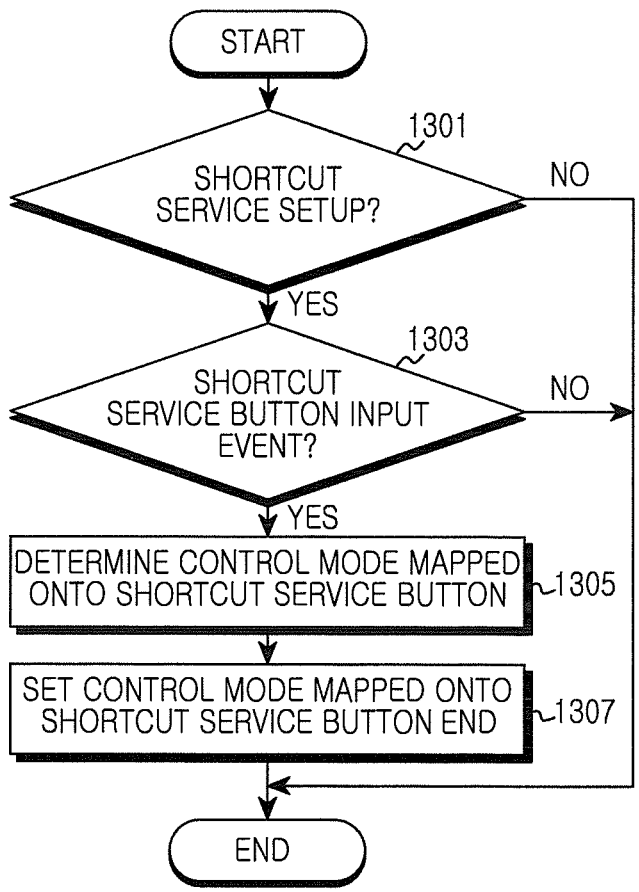
FIG. 13 illustrates a method for providing the control mode setup shortcut service in the portable terminal according to an exemplary embodiment of the present disclosure.

As such, when the control mode setup shortcut service is set in the portable terminal, the control unit 100 can provide the control mode setup shortcut service as shown in FIG. 13.

FIG. 13 illustrates a method for providing the control mode setup shortcut service in the portable terminal according to an exemplary embodiment of the present disclosure.

Referring to FIG. 13, the control unit 100 determines whether the control mode setup shortcut service is set in step 1301. For example, in the portable terminal of FIG. 1, the control unit 100 determines whether there exists the setup information of the control mode setup shortcut service configured by the portable terminal user.

When the control mode setup shortcut service is not set, the control unit 100 finishes this process.

By contrast, when the control mode setup shortcut service is set, the control unit 100 determines whether the shortcut service button input event occurs in step 1303. For example, the control unit 100 checks whether the user inputs the shortcut service button.

When the shortcut service button input event does not take place, the control unit 100 finishes this process.

By contrast, when the shortcut service button input event generates, the control unit 100 determines the control mode mapped onto the shortcut service button in step 1305.

In step 1307, the control unit 100 sets the control mode mapped onto the shortcut service button. For example, when a vibration mode is mapped onto the power button of the portable terminal, the control unit 100 determines whether the power button is input. When the power button of the portable terminal is pressed, the control unit 100 sets the vibration mode mapped onto the power button.

Next, the control unit 100 finishes this process.

In this exemplary embodiment, the control unit 100 sets the control mode mapped onto the shortcut service button.

In other embodiments, the control unit 100 may provide the control mode setup shortcut service by considering the shortcut service button input count.

Figure 14:
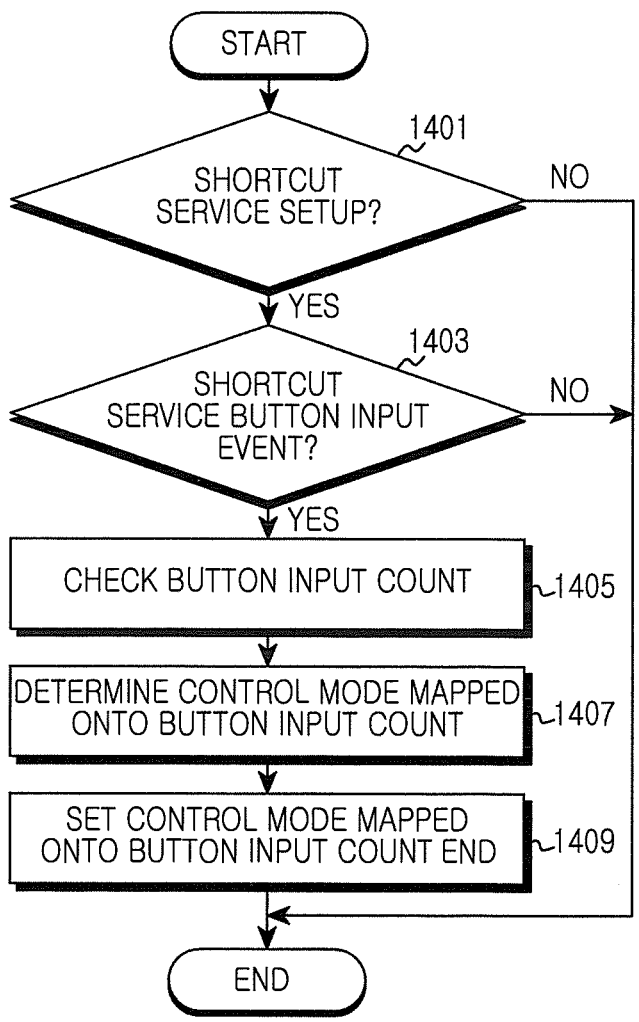
FIG. 14 illustrates a method for providing the control mode setup shortcut service by considering the shortcut service button input count in the portable terminal according to an exemplary embodiment of the present disclosure.

FIG. 14 illustrates a method for providing the control mode setup shortcut service by considering the shortcut service button input count in the portable terminal according to an exemplary embodiment of the present disclosure.

Referring to FIG. 14, the control unit 100 determines whether the control mode setup shortcut service is set in step 1401. For example, in the portable terminal of FIG. 1, the control unit 100 determines whether there exists the setup information of the control mode setup shortcut service configured by the portable terminal user.

When the control mode setup shortcut service is not set, the control unit 100 finishes this process.

By contrast, when the control mode setup shortcut service is set, the control unit 100 determines whether the shortcut service button input event occurs in step 1403. For example, the control unit 100 checks whether the user inputs the shortcut service button.

When the shortcut service button input event does not take place, the control unit 100 finishes this process.

By contrast, when the shortcut service button input event generates, the control unit 100 checks the shortcut service button input count in step 1405. For example, when the user presses the shortcut service button in step 1403, the control unit 100 checks the button count (i.e., a number of times the user pressed the button) such as one time, two times, three times, etc.

In step 1407, the control unit 100 determines the control mode mapped onto the shortcut service button input count.

In step 1409, the control unit 100 sets the control mode mapped onto the shortcut service button input count.

Next, the control unit 100 finishes this process.

In this exemplary embodiment, the control unit 100 provides the control mode setup shortcut service by considering the shortcut service button input count.

In other embodiments, the control unit 100 may provide the control mode setup shortcut service by considering the shortcut service button input duration.

Figure 15:
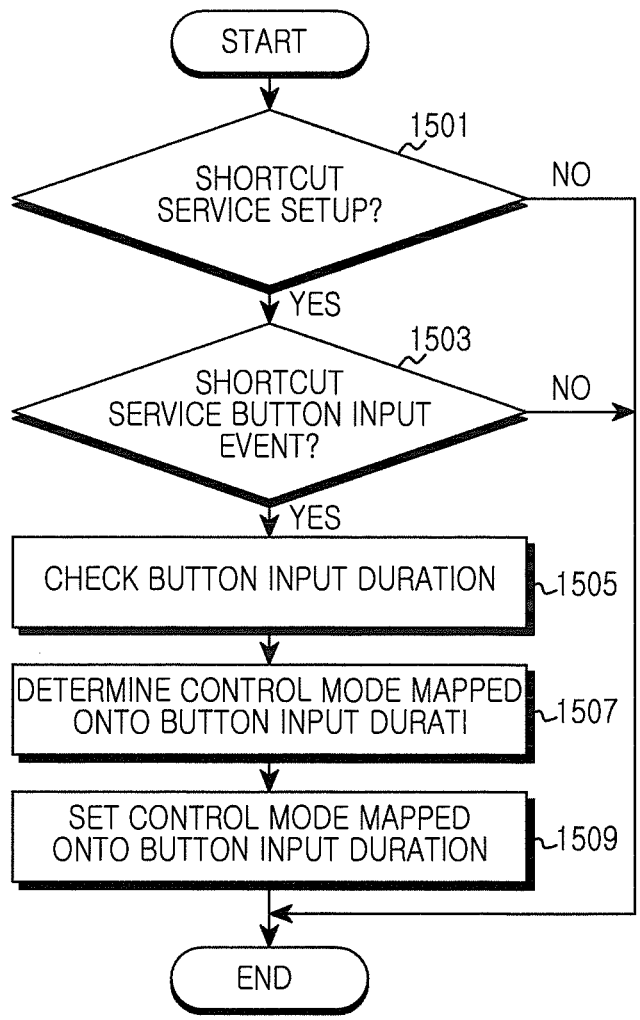
FIG. 15 illustrates a method for providing the control mode setup shortcut service by considering the shortcut service button input duration in the portable terminal according to an exemplary embodiment of the present disclosure.

FIG. 15 illustrates a method for providing the control mode setup shortcut service by considering the shortcut service button input duration in the portable terminal according to an exemplary embodiment of the present disclosure.

Referring to FIG. 15, the control unit 100 determines whether the control mode setup shortcut service is set in step 1501. For example, in the portable terminal of FIG. 1, the control unit 100 determines whether there exists the setup information of the control mode setup shortcut service configured by the portable terminal user.

When the control mode setup shortcut service is not set, the control unit 100 finishes this process.

By contrast, when the control mode setup shortcut service is set, the control unit 100 determines whether the shortcut service button input event generates in step 1503. For example, in the portable terminal of FIG. 1, the control unit 100 checks whether the user inputs the shortcut service button.

When the shortcut service button input event does not take place, the control unit 100 finishes this process.

By contrast, when the shortcut service button input event generates, the control unit 100 checks the shortcut service button input duration in step 1505. For example, when the user presses the shortcut service button in step 1503, the control unit 100 checks the button duration such as 2~5 seconds and 5~10 seconds.

In step 1507, the control unit 100 determines the control mode mapped onto the shortcut service button input duration.

In step 1509, the control unit 100 sets the control mode mapped onto the shortcut service button input duration.

Next, the control unit 100 finishes this process.

As such, the control unit 100 provides the control mode setup shortcut service.

Now, a method for providing the shortcut service for the control mode setup in the portable terminal which is running one application is explained.

Figure 16:
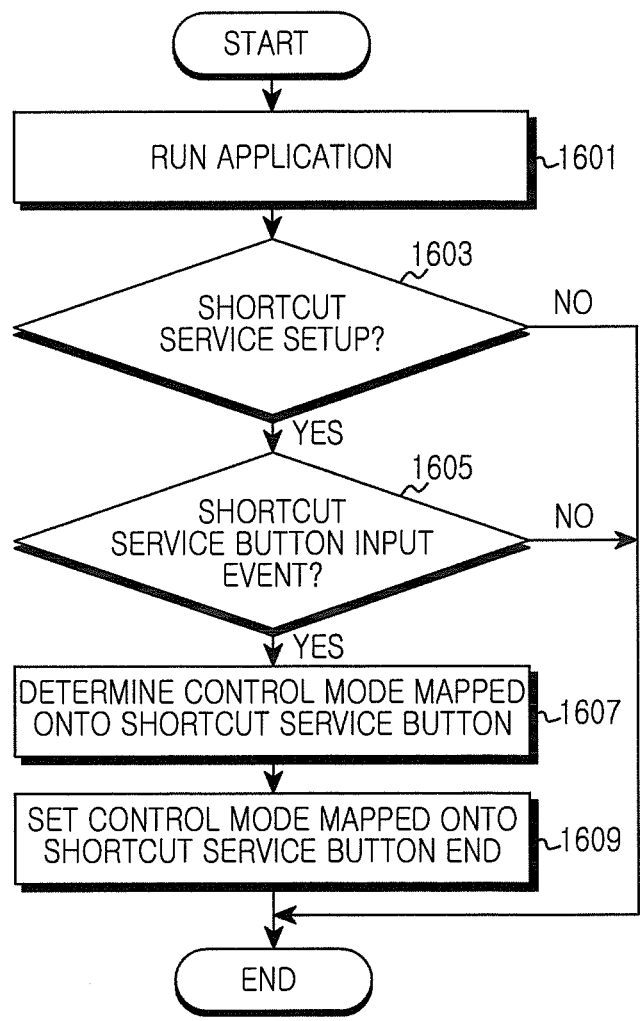
FIG. 16 illustrates a method for providing the control mode setup shortcut service in the portable terminal which is running one application according to an exemplary embodiment of the present disclosure.

FIG. 16 illustrates a method for providing the control mode setup shortcut service in the portable terminal which is driving one application according to an exemplary embodiment of the present disclosure.

Referring to FIG. 16, the control unit 100 runs the application for providing the shortcut service in step 1601.

In step 1603, the control unit 100 determines whether the control mode setup shortcut service is set. For example, in the portable terminal of FIG. 1, the control unit 100 determines whether there exists the setup information of the control mode setup shortcut service configured by the portable terminal user.

When the control mode setup shortcut service is not set, the control unit 100 finishes this process.

By contrast, when the control mode setup shortcut service is set, the control unit 100 determines whether the shortcut service button input event generates in step 1605. For example, the control unit 100 checks whether the user inputs the shortcut service button.

When the shortcut service button input event does not generate, the control unit 100 finishes this process.

By contrast, when the shortcut service button input event occurs, the control unit 100 determines the control mode mapped onto the shortcut service button in step 1607.

In step 1609, the control unit 100 sets the control mode mapped onto the shortcut service button. For example, when the vibration mode is mapped onto the power button of the portable terminal, the control unit 100 determines whether the power button is input. When the power button of the portable terminal is pressed, the control unit 100 sets the vibration mode mapped onto the power button.

Next, the control unit 100 finishes this process.

As set forth above, when the shortcut service button input event generates in the portable terminal, the application mapped onto the shortcut service button is driven so that the user can easily run or set his/her desired application in the portable terminal.

In addition, when the shortcut service button input event generates in the portable terminal, the control mode mapped onto the shortcut service button is set so that the user can easily set his/her desired control mode in the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a shortcut service in a portable terminal, the method comprising:
   in response to a selection of a shortcut setup mode, displaying a visual user interface configured for operation on the portable terminal's touch screen, wherein the visual user interface includes an array of icon slots including icons of candidate applications for shortcut setup operation and a shortcut setup area and wherein the shortcut setup area includes a vacant icon slot for receiving an icon moved from the list via a drag operation by a user;
   registering an application among the plurality of applications to the shortcut setup area in response to detecting a drag of a displayed icon for the application onto the vacant icon slot;
   upon detecting presence of the dragged icon in the vacant icon slot and a selection of a shortcut button,
   mapping the shortcut setup area to a shortcut button based on a number of times the shortcut button was input or a shortcut button input duration; and
   executing the registered application in response to detecting an input of the shortcut button.

2. The method of claim 1, wherein the shortcut service comprises at least one of an application executing shortcut service and a control mode setup shortcut service.

3. The method of claim 2, wherein the control mode setup shortcut service comprises at least one of wireless Internet setup, Bluetooth setup, location service setup, and automatic screen rotation setup.

4. The method of claim 1 further comprising:
   before mapping the shortcut setup area to the shortcut button, determining the shortcut button among a plurality of shortcut buttons to map onto the shortcut setup area.

5. The method of claim 1 further comprising:
   before mapping the shortcut setup area to the shortcut button, determining an application for executing the shortcut service.

6. The method of claim 1, wherein executing the registered application comprises:
   determining whether the shortcut button is input;
   in response to determining that the shortcut button is input, determining an application mapped onto the shortcut button; and
   executing the determined application.

7. The method of claim 1, wherein executing the registered application comprises:
   in response to determining that the shortcut button is input, determining the number of times the shortcut button was input; and
   determining the application mapped to the number of times the shortcut button was input.

8. The method of claim 1, wherein executing the registered application comprises:
   in response to determining that the shortcut button is input, determining the duration of the input of the shortcut button; and
   determining the application mapped to the duration of the input of the shortcut button.

9. The method of claim 1, wherein the shortcut button comprises at least one hardware button, at least one software button, or at least one icon displayable through the touch screen.

10. An apparatus configured to provide a shortcut service to execute a service in a portable terminal, the apparatus comprising:
    a touch screen configured to display, in response to a selection of a shortcut setup mode, a visual user interface configured for operation on the portable terminal's touch screen, wherein the visual user interface includes an array of icon slots including icons of candidate applications for a shortcut setup operation and a shortcut setup area and wherein the shortcut setup area includes a vacant icon slot for receiving an icon moved from the list via a drag operation by a user; and
    a control unit configured:
      to register an application among the plurality of applications to the shortcut setup area in response to detecting a drag of a displayed icon for the application onto the vacant icon slot;
      to map, upon detecting presence of the dragged icon in the vacant icon slot and a selection of a shortcut button, the shortcut setup area to a shortcut button based on a number of times the shortcut button was input or a shortcut button input duration; and
      to execute the registered application in response to detecting an input of the shortcut button.

11. The apparatus of claim 10, wherein the shortcut service comprises at least one of an application executing shortcut service and a control mode setup shortcut service.

12. The apparatus of claim 11, wherein the control mode setup shortcut service comprises at least one of wireless Internet setup, Bluetooth setup, location service setup, and automatic screen rotation setup.

13. The apparatus of claim 10, wherein the control unit is further configured to determine the shortcut button among a plurality of shortcut buttons to map onto the shortcut setup area.

14. The apparatus of claim 10, wherein the control unit is further configured to determine an application for executing the shortcut service.

15. The apparatus of claim 10, wherein, in response to determining that the shortcut button is input, the control unit is further configured to execute an application mapped onto the shortcut button.

16. The apparatus of claim 10, wherein the control unit is further configured to determine an application mapped to a number of times the shortcut button was input.

17. The apparatus of claim 10, wherein the control unit is further configured to determine an application mapped to a duration of the input of the shortcut button.

18. The apparatus of claim 10, wherein the shortcut button comprises at least one hardware button, at least one software button, or at least one icon displayable through the touch screen.

19. The method of claim 1, wherein mapping the shortcut setup area to a shortcut button is performed based on detecting a predetermined gesture.

20. The apparatus of claim 10, wherein the control unit is further configured to map the shortcut setup area to a shortcut button based on detection of a predetermined gesture.

21. The method of claim 1, wherein the shortcut setup area is mapped according to type of shortcut button or way of input of the shortcut button.

22. The apparatus of claim 10, wherein the control unit is further configured to map the shortcut setup area according to type of shortcut button or way of input of the shortcut button.

\* \* \* \* \*